(12) United States Patent
Wood et al.

(10) Patent No.: US 6,453,127 B2
(45) Date of Patent: *Sep. 17, 2002

(54) ESTABLISHMENT AT A REMOTE LOCATION OF AN INTERNET/INTRANET USER INTERFACE TO A COPIER/PRINTER

(75) Inventors: Christopher G. Wood, Caledonia; Thomas R. Hull, Spencerport; Richard E. Sikorski, Rochester; Daniel H. Adams, Pittsford, all of NY (US)

(73) Assignee: Nexpress Solutions LLC, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/937,989

(22) Filed: Sep. 26, 1997

(51) Int. Cl.[7] .................. G03L 15/00; G06F 15/00
(52) U.S. Cl. ............... 399/8; 399/81; 358/1.15; 703/24; 707/10; 709/218
(58) Field of Search ............ 399/8, 81; 395/112, 395/114, 500; 358/1.13, 1.15; 709/218, 219; 703/23, 24; 707/10

(56) References Cited

U.S. PATENT DOCUMENTS

| | | | |
|---|---|---|---|
| 5,113,222 A | | 5/1992 | Wilson et al. |
| 5,121,113 A | | 6/1992 | Kedge et al. |
| 5,572,643 A | | 11/1996 | Judson |
| 5,579,087 A | | 11/1996 | Salgado |
| 5,699,494 A | * | 12/1997 | Colbert et al. ............ 395/114 |
| 5,754,830 A | * | 5/1998 | Butts et al. ............... 395/500 |
| 5,956,487 A | * | 9/1999 | Venkatramen et al. ..... 709/218 |
| 6,184,996 B1 | * | 2/2001 | Gase ......................... 358/1.15 |
| 6,233,543 B1 | * | 5/2001 | Butts et al. ................. 703/27 |

\* cited by examiner

*Primary Examiner*—Joan Pendegrass

(57) ABSTRACT

A copier or printer apparatus provides printed copies in accordance with instructions provided by respective remote users of the apparatus. The apparatus comprises a marking engine for printing copies of information; a user interface supervisor for controlling interface between users and the marking engine; and a network web server that downloads software to a computer at a remote location to which a remote user has access to provide user interface software for establishing a user operational interface for communicating requirements for a print job to the user interface supervisor for printing by the marking engine. In operation, the web server downloads applets for execution by the computer at the remote location wherein downloaded applets provide a program for the computer at the remote location to process data for a printer interface display screen page for viewing by the remote user.

28 Claims, 4 Drawing Sheets

FIG. 4

SCAN: JOB ID #00000/STORAGE LOCATION/JOB NAME/QTY: 000000

SCAN · REPRINT · ASSEMBLE · MANAGE

JOB INFORMATION · STANDARD FEATURES · JOB-LEVEL FEATURES · PAGE-LEVEL · INSTRUCTIONS

SIDE IMAGED: 1→1, 1→2, 2→1, 2→2

COLLATE: YES, NO, GLASS

PAPER
- BODY: NAME A4, 20 LB. WHITE STANDARD
- COVERS: FRONT: A4 PRINT – 1 SIDE; BACK: A4 PRINT – 2 SIDES

CHECK SUPPLIES · SELECT

IMAGE QUALITY: 9, 8, 7, 6, 5, 4, 3, 2, 1

REDUCE/ENLARGE: 100, +, −, PRESETS...

FINISHERS: TOP EXIT, STAPLER..., STACKER..., BOOKLET MAKER..., OTHER

QUANTITY: 99999

QUEUE: PRINTER #3

| ID: | OWNER: | NAME: | QTY: | DONE: |
|---|---|---|---|---|
| 006 | FIDELITY INVESTMENTS | BROCHURE | 200 | 156 |
| 007 | BOSTON BANK | PROSPECTUS | 150 | 0 |
| 008 | FLEET | SCHEDULE | 1200 | 0 |
| 009 | PUTNAM INVESTMENTS | ANNOUNCEMENT | 800 | 0 |
| 010 | MARK & WILL'S GRILL | MENU | 300 | 0 |

◁ ▷ REVIEW JOB

STATUS

READY TO SCAN

PRINTER #3
PRINTING JOB ID: 006

ESTABLISHMENT AT A REMOTE LOCATION OF AN INTERNET/INTRANET USER INTERFACE TO A COPIER/PRINTER

BACKGROUND OF THE INVENTION

1. Field of the Invention

The invention relates to networked copiers/printers and more particularly to an apparatus and method to facilitate a user's set-up of production jobs for running the copier and/or printer while the user is at a remote location.

2. Description of the Prior Art

In the prior art, copier and/or printers are known wherein a job either scanned or generated by, for example, a computer or word processor is stored along with other jobs in a file server. Alternatively, provision may be made for scanned jobs to be input to the copier's job image buffer without waiting in the file server's queue. Details for printing the job such as number of copies and other well known details can be set-up at a remote terminal and the job file sent to a server where the job is queued and waits its turn for sending to the copier and/or printer (hereinafter copier/printer). If there is a need to change the job production requirements or the priority in the queue, the list of jobs waiting in the queue is available to the user at the remote terminal and adjustments may be made. There is thus provided the advantage that users at remote locations from the copier/printer may make adjustments or provide copy or print job (both hereinafter referred to as print jobs) set-ups without the need to actually be present at the machine.

A problem, however, is that users of the copier/printer, in order to have this access, must have the same software packages and same types of computer system platforms, i.e., IBM PCs, Apple Computers or Sun Microsystems workstations. A site system administrator may have to load and administer this software on multiple platforms and hundreds of computers. When upgrade is needed, each machine using this software needs to have the software updated.

A second problem exists in that there is no interaction with the copier/printer until the print job is actually sent. Since most printers today do not support bidirectional communication, the user of the system must go to the copier/printer to see if their job has printed.

SUMMARY OF THE INVENTION

It is an object of the invention (1) to provide a user interface to all users on the Internet and/or intranet without loading software packages on every computer system and (2) provide real-time communication with the copier/printer during job setup. After the print job is submitted to the copier/printer, the user will be able to query the system remotely, to check on the status of their print job. To access the user interface remotely, the user will use a Java-enabled Web Browser. To upgrade software, the site system administrator will only need to load the new software in one place (on the copier/printer). The next time a user accesses the copier/ printer with their Web Browser, a new Java applet will be downloaded to their machine.

In accordance with the invention, there is provided a copier or printer apparatus for providing printed copies in accordance with instructions provided by respective remote users of the apparatus, the apparatus comprising a marking engine for printing copies of information; a user interface supervisor for controlling interface between users and the marking engine; and a network web server which downloads software to a computer at a remote location to which a remote user has access to provide user interface software for establishing a user operational interface for communicating requirements for a print job to the user interface supervisor for printing by the marking engine.

In accordance with another aspect of the invention, there is provided a method of operating a copier or printer apparatus having a marking engine for providing printed copies in accordance with instructions provided by respective remote users of the apparatus, the method comprising operating a network web server to download software to a computer at a remote location to which a remote user has access to provide user interface software for establishing a user operational interface display on the computer for use in communicating requirements for a print job for printing by the marking engine; and operating the marking engine for printing copies of information in accordance with the requirements for the print job

BRIEF DESCRIPTION OF THE DRAWINGS

The subsequent description of the preferred embodiments of the present invention refers to the attached drawings wherein:

FIG. 4 is an example of a user interface screen that may be accessed by a remote user via the Internet or intranet networked copier/printer system of FIG. 1.

DESCRIPTION OF THE PREFERRED EMBODIMENTS

Because apparatus of the general type described herein are well known, the present description will be directed in particular to elements forming part of, or cooperating more directly with, the present invention.

The system described herein may desirably employ known systems and software for image generation, workstations or terminals, and printer and scanner controls.

Figure 1:
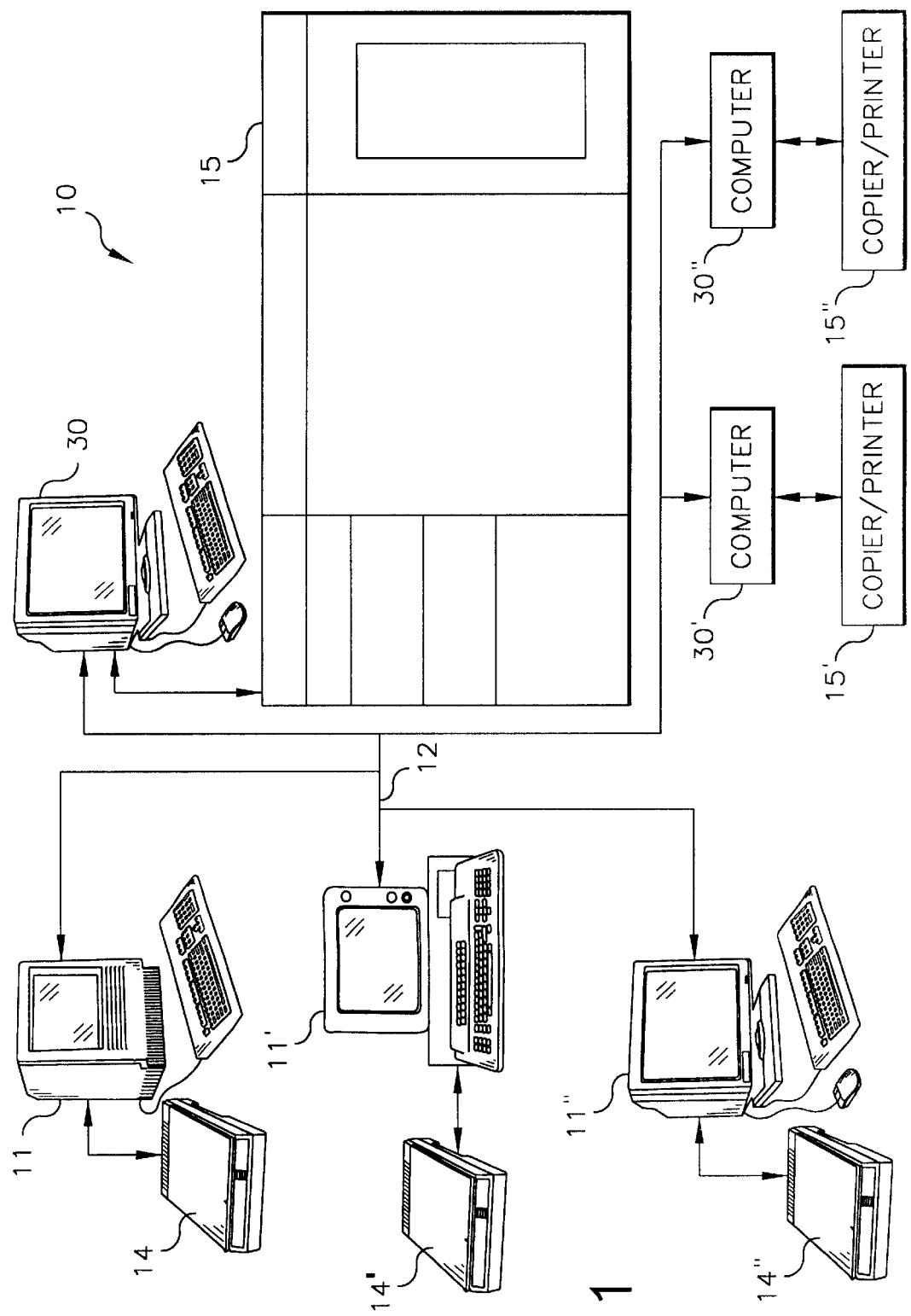
FIG. 1 is a schematic view depicting components of an Internet or Intranet networked copier/printer system programmed to operate in accordance with the method and apparatus of the invention.

With reference now to FIG. 1, an exemplary networked document production system 10 is illustrated. The system 10 includes a plurality of remote workstations 11, 11', 11" connected through the Internet or an intranet network 12 to one or more computers 30, 30' running Web Server software. The computers 30, 30' are each connected either directly or over a similar communication network with a respective copier/printer 15, 15'. Typically the computers 30, 30' may be placed upon or next to the respective copier/printer 15, 15'. The computers 30, 30' each also acts as a respective file server to store documents or alternatively the file server may be separate from the respective computers 30, 30'. The computers 30, 30' each stores print jobs in a queue for transmission to respective marking engines 15, 15'. User interface software is also resident on each computer 30, 30' to allow a user to interface with the respective copier/printer for setting up a print job. The remote workstations 11, 11', 11" each run web browser software to connect to, for example, the Internet/intranet. When a user of one of the remote workstations desires to connect to, for example, the copier/printer 15 using the web browser software package, the web server software resident on computer 30 causes the computer 30 to download the user interface software to the workstation requesting a connection. After the user interface software has been downloaded to the requesting remote workstation, it begins executing on the respective remote workstation 11, 11', 11". The copier/printer 15 may be a black-and-white or color electronic copier/printer, preferably of the electrophotographic type, however, other forms of electronic copier/ printers may also be used. As is well known, image data of each of plural jobs may be stored in electronic form on a storage device associated with the remote workstations 11, 11', 11" or on computer 30. A scanner 14, 14', 14" may additionally be part of each workstation. The print jobs may be obtained from documents scanned into scanners 14, 14', 14" associated with a respective computer 11, 11', 11" or documents created originally on the computers or modified after scanning into the computers. Each job may comprise plural pages of images for printing and a request for printing each production job may have various parameters associated with the job. An example of a set of parameters can be seen in FIG. 4 which is a basic user interface display page for the printer 15. As can be seen from the display page, a user has choice selections across a top row to select various job operations such as scan, reprint, assemble, manage, reset, proof set, send/start. The various job operations for selection and other options being described may be selected via touch screen operation, mouse-cursor selection or through buttons provided as part of the screen or on an accessory housing.

The various job operations will now be described.

Scan operation—The scan operation gives a user the ability to scan hard copy originals into the system and either store or print copies of the original.

Reprint operation—The reprint operation gives a user the ability to select document files from storage and print hard copy.

Assemble operation—The assemble operation gives the ability to create new documents from existing documents. Documents can be edited, reordered, merged, deleted and annotated.

Manage operation—The manage operation gives a user the ability to view jobs in the system and manage the workflow for a printing system, perform system administration set of the system and customer maintenance of the printer.

Below this row of operation options is a display line indicating the operation selected, the job ID number/storage location for the job, job name and quantity currently being worked on. In the example of FIG. 4 the scan operation is selected.

Below the display line are several columns of options, namely sides to be imaged, collate selections, paper supply options, image quality (darken-lighten) selections, reduction/enlargement selection, finisher selections, quantity requested. Additional display options for selection can call up job information such as job level features, page level features, and instructions. The job level and page level features allow each job to be set up in accordance with complex features drawn to changes or editing on a page level basis within a job. Other features include image annotation and image merge, etc. In this regard, see U.S. Pat. No. 5,113,222.

Additional information on the display page may include a display section indicating jobs currently in the server print queue and a status section identifying the state of the selected printer and the selected scanner. The above display page is typical of a display for a printer that can be accessed either by a walk-up user at computer 30, 30' or by a user at one of the remote workstations 11, 11', 11" attached to, for example, local area network (LAN) or the Internet via a modem or other suitable connection.

While it is known to transmit data remotely for printing via a more generally accessible system such as on the Internet the ability to set up the job for specific print requirements using the printer's display screen user interface is not available without the user having available a specific software package and operating system essentially duplicating that of the printer's normal interface.

Figure 2:
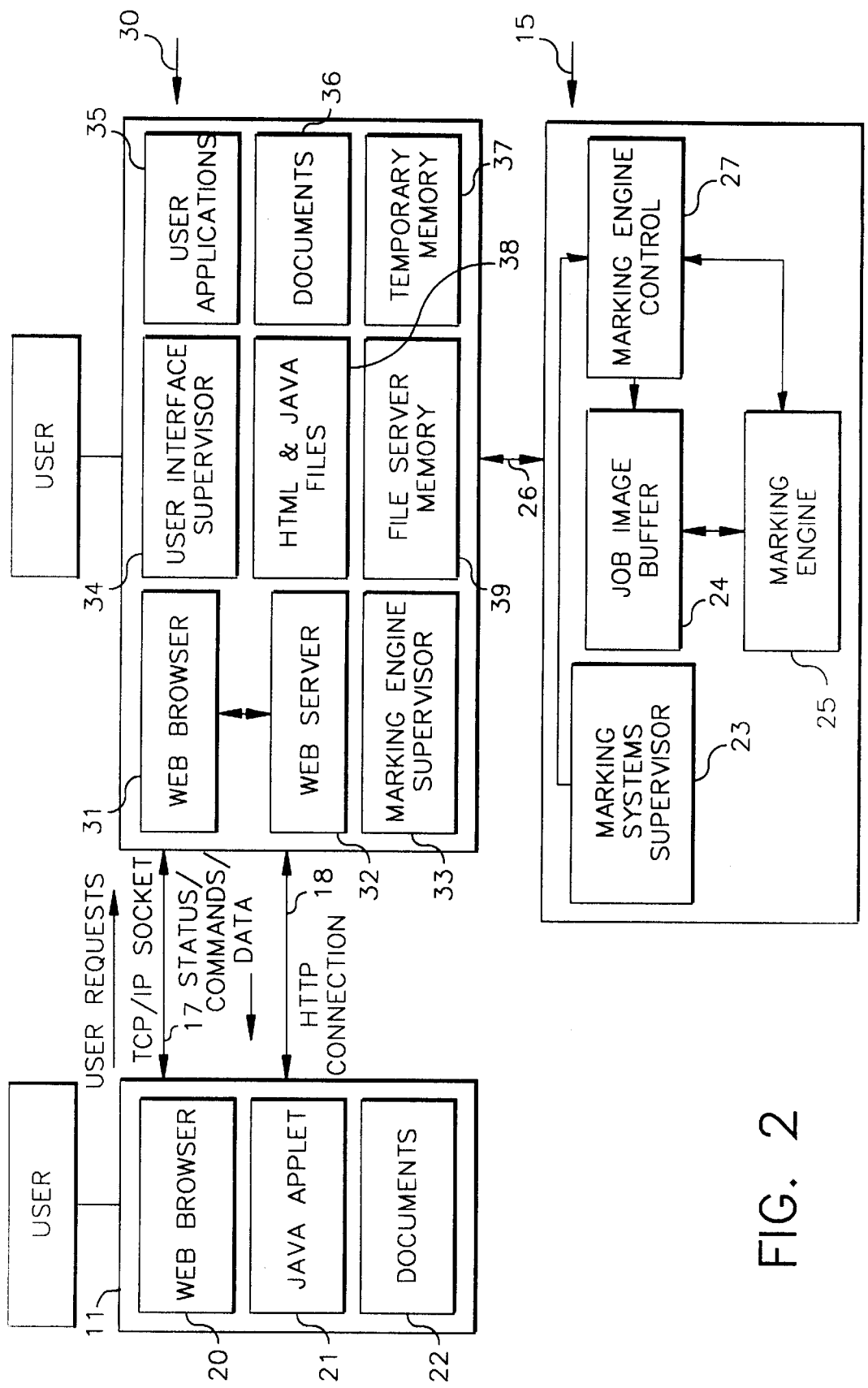
FIG. 2 is a block diagram of a control system for enabling a user to interface with a copier/printer apparatus of FIG. 1 in accordance with the method and apparatus of the invention.

With reference now to FIG. 2, a block diagram of a control system enabling a user at a remote workstation 11, 11', or 11" to interface with a printer apparatus 15 of FIG. 1 in accordance with the method and apparatus of the invention is illustrated. In FIG. 2, only workstation 11 is illustrated cooperating with computer 30 and printer 15, it being understood that the other workstations operate substantially simultaneously albeit their possibly having different computer operating systems as noted in FIG. 1. In addition, the various workstations 11, 11', 11" may be networked with each of the computers 30, 30' to set up printing jobs on the respective printers 15, 15' similarly to that described with reference to FIG. 2. In accordance with the invention, a printer user interface software package and specific operating system need not be resident with a user's terminal at a remote location. Rather, access to the printer for setup of a production job is provided via a network connection to computer 30 which is running web server software to which multiple remote users may also have access to.

In the schematic of FIG. 2, an intranet network is shown capable of supporting plural client remote workstations 11, 11', 11". Each workstation is connected via, for example, a LAN type intranet network or the Internet, to a web server computer 30. Connection via satellite or wireless telephone is also contemplated. The web server computer 30 may take the form of a Sun Microsystems work station and have various application programs as indicated. The web server computer 30 includes file server memory 39 for also storing copy or print jobs and thus is a special purpose file server tailored for receipt of jobs from the network which could be the worldwide web. The computer 30 supports hypertext transport protocol (HTTP) and File Transfer Protocol (FTP) and listens for information on a particular port on its machine and responds by sending documents and data to the requester at the remote workstations. Requests for connection are made by the workstations by use of resident web browser programs 20 resident at the respective workstations 11, 11', 11".

A web browser is a program that runs on a client computer 11, 11' or 11" (the client computer or workstation can be an IBM PC, Macintosh, Sun Microsystems workstation, etc.). The browser makes connection to a machine that is running a web server, and receives documents and data. If a Java applet is downloaded to the client's computer, the client's computer will operate a Java Virtual Machine and will execute the program. The software for the Java Virtual Machine is a part of the web browser software package 20 (Java enabled browser) on the client's workstation 11, 11' or 11". The Java Virtual Machine provides the platform independence so that users may run programs from a variety of client computer operating systems. Java is a computer programming language created by Sun Microsystems. The Java language is very similar to the C++ programming language. A unique design aspect of the Java programable language is its support for the Internet.

The web server computer 30 includes a web server application program 32 which interfaces with requests from the web browser 20 using an http (hyper-text transport protocol) connection 18. The web server application program 32 has access via operating system software to a series of files 38 that include user interface display screen pages in hyper-text markup language (html) as well as "applets" for establishing a program on the user's computer for receiving the interface screen pages and providing user interaction with a User Interface Supervisor 34. Applets are created in the Java language and are small software applications that are platform independent and run under the web browser's 20 control. The applets provide TCP/IP connections (sockets) 17 between user interface screens and the User Interface Supervisor 17. The User Interface Supervisor 34 is a software program that may be resident in the web server computer 30 that translates user requests coming from Java applets 21 now established in the web browser 20 into events going to a User Applications Program 35 which are basically the software typically resident on a copier/printer that are used to make up all of the feature functions available to a user. These known features are identified above.

The User Interface Supervisor 34 also translates status and commands from the User Applications 35 into status and commands that are sent to the Java applets 21 in the web browser 20. For non-diagnostic displays, i.e., print job set-up data, it provides sequencing of displays and internationalization. In the case of diagnostics displays, sequencing internationalization is via HTML and Java. The diagnostic displays are, for example, displays that communicate error (s) in machine operation or need for maintenance. Internationalization is a subprogram that provides the necessary functions to support foreign languages.

Application subprograms forming the User Interface Supervisor 34 include: an applet/screen interface which contains the communication routines necessary to communicate with the screen applets, an interface translator which converts messages from applets to a format that can be understood by the User Applications program, and messages from the User Applications program 35 to a format that can be understood by the applets 21 in the web browser 20. An application interface subprogram contains the communication routines necessary to communicate with the User Applications program 35. A User Interface Manager subprogram of the User Interface Supervisor provides "thread" and "sockets" for each user connected to the web server. The "thread" and "sockets" are respectively clear communication pathway opportunities and connections for the respective users. The connections 17, 18, while shown as separate lines, are actually on the same set of wires typically but represent communication with different protocols.

Figure 3:
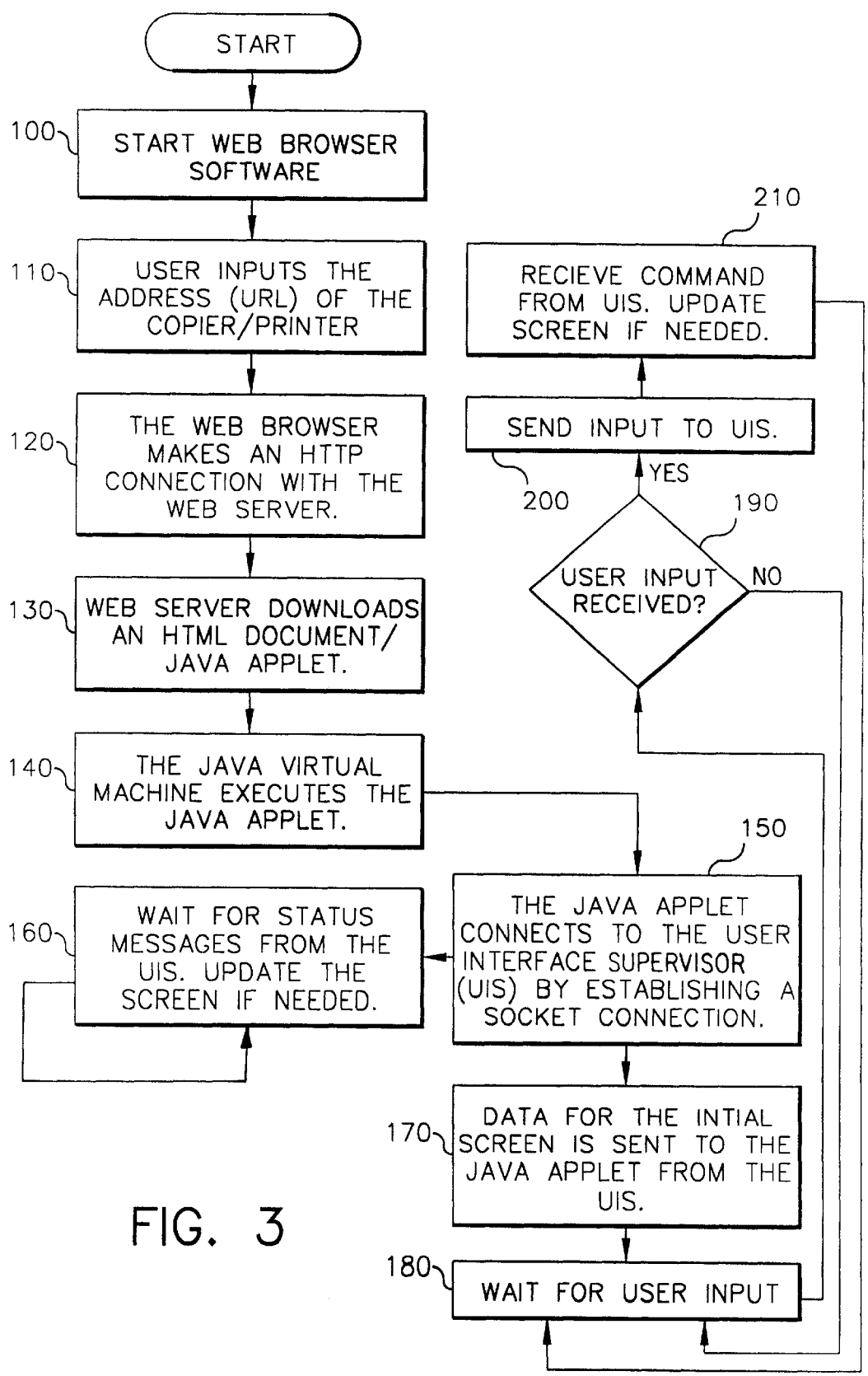
FIG. 3 is a flowchart for establishing a user interface at a remote location for a user to set up a print or copy job for printing in accordance with the method of the invention.

In use of the apparatus of FIGS. 1 and 2, and with reference to the flowchart of FIG. 3, a user at any one of the user remote computer or workstations 11, 11' or 11" starts a web browser software application program 20 resident in the respective workstation and operable with a conventional computer operating system such as Windows, Macintosh or Unix. Examples of web browser applications are Netscape Navigator Microsoft Internet Explorer or Sun Hot Java, etc. The user, say at workstation 11, in response to a prompt from the web browser's conventional search screen display inputs the Internet or intranet address (Uniform Resource Locator or URL) of the copier/printer, step 110. In Step 120, in response to entry of the address, the web browser 20 makes an http connection 18 with the web server 32 of computer 30. The web server 32 then downloads an HTML document and a Java applet from an HTML document and Java files 38, step 130. The Java applet may be an application program for enabling display of the downloaded document, which could be an initial printer screen page providing a prompt for the user to input an identification (ID) code to provide access to the copier/printer where user authorized codes are required. The Java Virtual Machine in step 140 executes the Java applet, step 140, to enable the remote workstation to display the initial display page. In step 150, the Java applet running in the Java Virtual Machine of the web browser will connect to the User Interface Supervisor (UIS) 34 of the computer 30 by establishing a TCP/IP (Transmission Control Protocol/Internet Protocol) socket communication connection 17 between the UIS 34 and the workstation 11. In step 180, the workstation 11 waits for a user input. When a user input is received of say the ID (identification) code, step 190, the user input is sent to the UIS 34, step 200. In response, in step 210, the UIS provides data and other commands through the thread and socket connection to the work station 11 for the next user interface screen such as the display screen page illustrated in FIG. 4 to allow input of user data regarding the requirements for the print job. The Java applet 21 previously provided to terminal 11 is programmed to accept the new screen page input data from the UIS 34 and to communicate the data regarding print job requirements (requests) as input by the user to the UIS via the TCP/IP socket connection 17. The process for providing additional screens or recalling previous screen pages are provided over the TCP/IP socket communication connection 17. To the operator at the remote terminal, the interface with the copier/printer after establishing the thread and socket or TCP/IP communication channel appears similar to that of an operator control/panel of a conventional copier/printer.

After the user requirements for reproduction of the print job is provided, the print job residing in a documents file memory 22 at the workstation is identified by the user, say by file name, and is downloaded from the file memory 22 (such as hard disk drive) of the workstation 11 to a temporary memory storage file 37 that is part of computer 30.

When the printer is ready to accept the next job to be printed and this job is the print job above-referred to and stored in temporary memory 37, the marking engine supervisor 33 in computer 30 communicates over bus 26 with the marking systems supervisor 23 of the copier/printer 15. The marking systems supervisor 23 then signals the marking engine control 27 to signal the job image buffer 24 to accept the print job from temporary memory 37 into the job image buffer 24. The print job is downloaded to the job image buffer 24 which stores the entire print job. The storage of the entire job in the job image buffer 24 allows plural copies to be made using electronic recirculation of data as is described in U.S. Pat. No. 5,047,955 and 5,623,585, the contents of both of which are incorporated herein by reference.

As the print job is running, the copier/printer 15 provides status and error messages. These messages might include information such as number of copies completed, number to be completed and possibly other messages. Error messages indicating a jam or malfunction in a machine component may also be provided. These messages are communicated by the marking systems supervisor 23 over the bus 26 to the marking engine supervisor 33 and then to the UIS 34. They are then communicated over the TCP/IP socket 17 to the net web browser Java applet 21 and displayed on the workstations CRT or other similar type display, step 160.

In lieu of printing documents from the workstation, the user at terminal 11, through say an access code communicated via the socket 17, may access a file server memory 39 or library of documents in computer 30 to print a document file resident in this memory. The UIS 34 communicates display pages of the files resident in memory 39 and the user requests communicated over socket 17 to the UIS 34 provides an indication of the selection of a particular document is sent to the job image buffer 24 via lines 26 when the buffer is ready to receive the next document file. The file may then be printed by outputting same to the marking engine as described above. Computer 30 also serves as user interface for a walkup user of the copier/printer 15. The computer 30 includes a web browser 31 which communicates with web server 32 to use applets from the HTML and Java files 38 to be processed for establishing user interface display screen pages on the CRT or other type display of computer 30. A documents file memory 36 is also provided for storing documents input by the user at Computer 30. A remote user may also access the file server memory 39 to permanently store documents created or transmitted to the remote computer.

The invention has been described in detail with particular reference to preferred embodiments thereof and illustrative examples, but it will be understood that variations and modifications can be effected within the spirit and scope of the invention.

What is claimed:

1. A copier or printer apparatus for providing printed copies in accordance with instructions provided by respective remote users of the apparatus, the apparatus comprising:

a marking engine operable to print copies of information, the marking engine having a local user interface;

a user interface supervisor for controlling interface between users and the marking engine;

a network web server which downloads software to a workstation computer at a remote location to provide user interface software and data for establishing a user operational printer interface display screen page for communicating requirements for a print job to the user interface supervisor for printing by the marking engine, the user operational printer interface display screen page additionally providing control of the apparatus at the remote location by placing apparatus control functions on the user operational printer interface display screen, the network web server having a documents file memory accessible from each the marking engine locally and the remote location that retains status the print job status for the marking engine for each of the remote locations and the local user interface; and wherein the web server is operable to download applets for execution by the computer at the remote location wherein downloaded applets provide a program for the computer at the remote location to process data for the printer interface display screen page for viewing by the remote user.

2. The apparatus of claim 1 wherein the web server is operable to download to the computer an HTML document for creation of the printer interface display screen page, wherein a temporary memory within the apparatus stores the print job until the marking engine is ready to perform the print job, and a queue is formed within the temporary memory, the queue status being displayed on the printer interface display screen page at the remote location.

3. The apparatus of claim 2 wherein the applets may be executed by the computer to establish a socket connection with the user interface supervisor.

4. The apparatus of claim 3 wherein a web browser on the computer establishes an http connection with the web server.

5. The apparatus of claim 4 wherein the socket connection is a TCP/IP socket.

6. The apparatus of claim 1 wherein the applets are executable by the computer to establish a socket connection with the user interface supervisor.

7. The apparatus of claim 6 wherein a web browser is on the computer and establishes an HTTP connection with the web server.

8. The apparatus of claim 7 wherein the socket connection is a TCP/IP socket.

9. The apparatus of claim 1 and including a temporary memory for storing a print job at a location remote from the computer.

10. A method of operating a copier or printer apparatus having a marking engine with a user interface for providing printed copies in accordance with instructions provided by respective remote users of the apparatus, the method comprising:

operating a network web server to download software to a workstation computer including a display screen at a remote location to which a remote user has access to provide user interface display software for establishing a user operational interface display on the computer for use in communicating requirements for a print job for printing by the marking engine, the user operational interface display additionally providing user control of the apparatus by placing a complete complement of control functions en the user operational interface display at the remote location;

operating the marking engine for printing copies of information in accordance with the requirements for the print job;

providing the network web server with a documents file memory that retains file information for the marking engine and each of the remote locations and the local user interface, such that the records memory is accessible from each the user interface on the marking engine locally and the display screen on the remote location; and wherein the web server downloads applets for execution by the computer at the remote location and wherein downloaded applets provide a program for the computer at the remote location to process data for a printer interface display screen page for viewing by the remote user.

11. The method of claim 10 wherein the web server downloads to the computer an HTML document for creation of the printer interface display screen page.

12. The method of claim 11 wherein the applets are executed by the computer to establish a socket connection with a user interface supervisor of the copier or printer apparatus.

13. The method of claim 12 wherein a web browser on the computer establishes an HTTP connection with the web server.

14. The method of claim 13 wherein the socket connection is a TCP/IP socket.

15. The method of claim 10 wherein the applets are executed by the computer to establish a socket connection with the user interface supervisor.

16. The method of claim 15 wherein a web browser on the computer establishes an HTTP connection with the web server.

17. The method of claim 16 is wherein the socket connection is a TCP/IP socket.

18. The method of claim 10 wherein plural remote computers are in communication with the network web server and receive respective HTML documents from the network web server for creation of respective printer interface display screens at the remote computers.

19. The method of claim 18 wherein the plural remote computers operate on different computer platforms from each other.

20. The method of claim 10 and wherein the remote user operates the computer to access a remote file server memory having a document file resident in the memory and the document file is sent to a job image buffer and subsequently printed by the marking engine.

21. The method of claim 10 and wherein as the print job is running the copier or printer provides status and error messages that are communicated over a TCP/WP socket and displayed on the display screen.

22. The method of claim 10 wherein the print job is stored in a temporary memory that is remote from the computer.

23. A method of operating a printer;
   operating a workstation at a remote location from the printer to input an Internet or intranet address of the printer;
   in response to entry of the address, a web browser operating on the workstation makes a connection with a remote web server;
   operating the web server to download an HTML document and a Java applet and Java files, the Java applet being an application program for running in a Java virtual machine of the web browser to establish a communication connection between a user interface supervisor (UIS) operating remotely from the workstation;
   in response to inputs from the workstation by a user, the UIS provides data to the workstation to establish an interface screen to allow input of user input data regarding requirements for a print job, the interface screen additionally providing user control of the printer by placing a complement of control functions on the interface screen at the remote location;
   providing a user interface for the printer and further providing a documents file memory operatively connected to the printer that contains file information and is accessible from the workstation and the printer; and
   operating the printer to make prints in accordance with the requirements input by the user at the remote workstation.

24. The method of claim 23 wherein the print job is stored in a temporary memory that is remote from the workstation, wherein the temporary memory within the apparatus stores the print job until the marking engine is ready to perform the print job, and a queue is formed within the temporary memory, the queue status being displayed on the interface screen page at the remote location.

25. A method of operating a copier or printer apparatus having a marking engine for providing printed copies of a job in accordance with instructions provided by a remote user of the apparatus, the apparatus including a temporary memory for storing a document to be transferred to a job image buffer, the job image buffer for receiving the document from the temporary memory and adapted to electronically repetitively output to the marking engine data representing the document to be printed as multiple copies in collated sets, the method comprising:
   operating a network web server to download to a computer workstation at a remote location software applets for execution by the workstation, the workstation including a display screen to which a remote user has access and the applets providing user interface display software for establishing a user operational interface display on the workstation for use in communicating requirements for a print job for printing by the marking engine, the user operational interface display additionally providing user control of the apparatus by placing a complement of control functions on the user operational interface display at the remote location;
   downloading from the workstation at the remote location to the temporary memory a document to be printed by the marking engine;
   downloading from the temporary memory to the job image buffer the document to be printed in collated sets;
   providing a documents file memory containing file information that is accessible from a local user interface for the marking engine or from the remote user interface on the workstation; and
   operating the marking engine to print image data stored in the job image buffer and producing plural collated sets of the document.

26. The method of claim 25 wherein as the job is being printed the apparatus provides status and error messages to the user operational interface display, wherein a queue is formed within the temporary memory, the queue status being operatively coupled to the user operational interface display at the remote location.

27. The method of claim 25 wherein the apparatus includes a memory library of documents and the apparatus communicates display pages of the files resident in the library and a user at the remote workstation provides an indication of selection of a particular document in the library and in response thereto the document is sent to the job image buffer.

28. The method of claim 25 and wherein a second computer is located proximate the copier or printer apparatus and provides access to a walkup user of the apparatus and the web server downloads software applets for execution by the second computer, and the second computer includes a display screen and the applets provide user interface display software for establishing a user operational interface display on the proximate computer's display screen for use in communicating by the walkup user requirements for a print job for printing by the marking engine.

* * * * *